United States Patent [19]

Rebentisch

[11] Patent Number: 4,840,525
[45] Date of Patent: Jun. 20, 1989

[54] FASTENER RESTRAINER FOR FRAMING SYSTEM

[75] Inventor: Hugo E. Rebentisch, Garden City, Mich.

[73] Assignee: Unistrut International Corp., Ann Arbor, Mich.

[21] Appl. No.: 130,807

[22] Filed: Dec. 9, 1987

[51] Int. Cl.$^4$ ............................................. F16B 37/04
[52] U.S. Cl. ....................................... 411/85; 403/18; 403/348; 411/104; 411/112
[58] Field of Search ..................... 411/83–85, 411/103, 104, 111–113, 427, 533, 544, 552, 549, 172, 173; 403/17, 18, 348, 353

[56] References Cited

U.S. PATENT DOCUMENTS

| | | | |
|---|---|---|---|
| 3,483,910 | 12/1969 | LaLonde et al. | 411/84 X |
| 3,493,025 | 2/1970 | LaLonde et al. | 411/85 X |
| 4,146,074 | 3/1979 | Kowalski | 411/111 |
| 4,285,379 | 8/1981 | Kowalski | 411/85 |
| 4,410,298 | 10/1983 | Kowalski | 411/104 X |
| 4,460,299 | 7/1984 | Kowalski | 411/85 |
| 4,486,133 | 12/1984 | Pletcher | 411/84 |
| 4,666,355 | 5/1987 | Stover | 411/85 |

FOREIGN PATENT DOCUMENTS

| | | | |
|---|---|---|---|
| 81885 | 9/1956 | Denmark | 411/83 |
| 2468784 | 5/1981 | France | 411/85 |

*Primary Examiner*—Lloyd A. Gall
*Attorney, Agent, or Firm*—Gifford, Groh, Sheridan, Sprinkle and Dolgorukov

[57] ABSTRACT

A fastener for use in attaching structural channel members having slots extending along one side of the channel to other channel members or other structural elements. The fastener includes retaining means for holding the fastener in a selected position along the channel slot ready to receive a fastening bolt or the like for connecting the channel member to an additional structural member. The retaining means is designed so that during connection of the structural members the retaining means will be displaced and direct contact between the structural members being attached will be achieved.

7 Claims, 2 Drawing Sheets

FASTENER RESTRAINER FOR FRAMING SYSTEM

BACKGROUND OF THE INVENTION

1. Field

The invention pertains to fasteners and more particularly to mechanical nuts used in fastening structural members and attachments to structural members. In many instances nut-like members must be positioned within a channel, or the like, prior to attaching another member to the channel. Means must be used to maintain the nut in a pre-assembled position within the channel prior to as well as during attachment of the second structural member to the channel, through use of the nut. Many structural units are formed of an assembly of such channels and other members held together by nuts or the like, and the assembling process is considerably less time-consuming and less costly if means are provided for pre-positioning the nuts and maintaining the nuts in position until and during joining of the cross-members, brackets, panels, or other fixtures and fittings by means of bolts or the like.

2. Description of the Prior Art

Previous nut-type fasteners for use with channels have been provided with means for maintaining the fasteners in position. Some have employed clamping attachments. The latter are often formed of a resilient material such as spring steel and attached to nuts in a manner such that they will exert a clamping action between a nut and a channel within which the nut is placed. In other instances a helically shaped resilient appendage is extended from the nut and adapted to be positioned to the outside of the channel with the nut within the channel. The nut is then secured in place by twisting. This results in the channel flanges or lips being wedged between the appendage and the nut sufficiently to retain the nut in position until it is used in attaching an additional structural member.

In yet another method a helical spring is attached to the nut and projects from one side thereof within the channel. The arrangement in this case is such that the spring sits in the channel beneath the nut urging the nut against the lower edges of the channel lips to maintain the nut in position.

It is also known to apply a synthetic cone-like element to one face of a nut instead of a helical appendage in such a manner that when the nut is inserted into the channel the cone will remain above the open side of the channel. The insert will thus function to retain the nut in position once it is moved to a desired place and until final connection with the components by a bolt or the like.

A toothed surface is usually provided on the nuts to assist in locking the nuts against the channel lips.

SUMMARY OF THE INVENTION

The instant invention provides a fastener for channel type framing construction which does not require a metal coil spring on the inward facing side of the nut which must bear on the opposing inner side of the channel. It also avoids the use of resilient metal, spring members and clips attached to the forward facing side of the nut which impinge against the channel wedging the channel between the nut and the frame. Further it does not require a tool to position the nut and makes it possible to manipulate the nut by hand.

The hitherfore known methods of fixing the nut or bolts in position which do not require springs within the channels all suffer from another undesirable feature in that they result in elements which will remain interposed between the channel flanges or lips and whatever second member or fixture is attached to a channel. This can produce uneven surface contact as where a helical member is used and even if not, results in a spacing between the two structural members where direct contact for better load transmission would be preferred. In addition the frictional resistance to movement will be lower than if a direct metal to metal face to face contact between two members attached by the nuts or bolts or the like were achieved. Failure to obtain a direct contact could be particularly undesirable where the interposed element might provide a relatively high degree of lubricity as contrasted with a steel to steel contact as for example if the element interposed is made of a synthetic material such as a nylon.

According to the instant invention there is provided a synthetic resilient retainer on the top face of a nut which will engage the lips, or radii, on the two opposing sides of a slot in a channel when the nut attached thereto is pressed into the channel. Thereafter the unit can be rotated to move the major axis, the longer axis, of the nut under the lips of the channel to its proper channel-lip engaging position. In addition the retainer is structured and formed so as to provide for manual manipulation of the nut into the proper rest position with the longer face of the nut under the lips of the channel. Furthermore the retainer is designed and formed such that when the retainer and nut are rotated to the final resting position the retainer will bear against the outer face of the channel, and securely hold the nut in position by friction between the nut and its retainer, and the channel, yet the engagement between the retainer and the channel will be on the inwardly facing slopes of the channel lips as compared with the slot formed between the lips. Further the base of the retainer immediately below the portion of the retainer contacting the channel lips will be spaced inwardly of the locking teeth usually provided in the nut. In addition the flange-like portion of the retainer member overlying the nut and channel is formed of a material sufficiently flexible and dimensioned so that it will be forced downwardly into the channel groove as the second structural member or fixture is secured to the channel on tightening of the bolt or like into the nut.

The retainer is formed with a minor axis and a major axis positioned at right angles respectively to the corresponding axes of the nut face, the longer axis portion gives leverage for twisting the unit into final position while the shorter, minor axis portion provides for the forcing of the retainer into the channel slot on completion of tightening of the nut and bolt. The retainer has a base which projects downwardly from the major and minor upper wing-like sections. The base is attached to the nut face. The base section is of a diameter or a horizontal cross-section less than the width of the channel slot and provides ample clearance for insertion of the nut with attached retainer and forced entry of the retainer wings down within the channel in the final locking of the components.

The invention also provides for a relatively inexpensive synthetic member for securing the nut in place as well as a simple yet inexpensive but nonetheless reliable manner of fixing the member to the nut.

DETAILED DESCRIPTION OF A PREFERRED EMBODIMENT OF THE INVENTION

Figure 1:
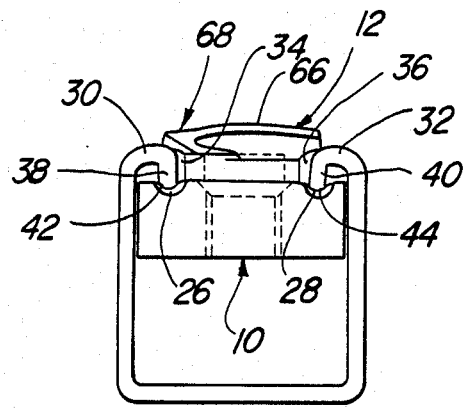
FIG. 1 is an end view of a channel showing a nut having a retainer according to the invention positioned in the channel.
Figure 2:
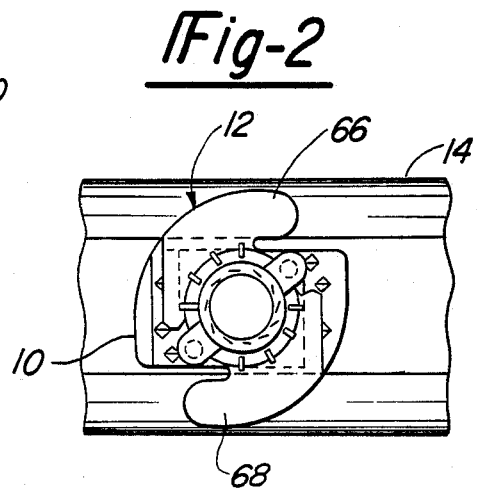
FIG. 2 is a top plan view of the structure of FIG. 1 with the nut and retainer in a first position.
Figure 3:
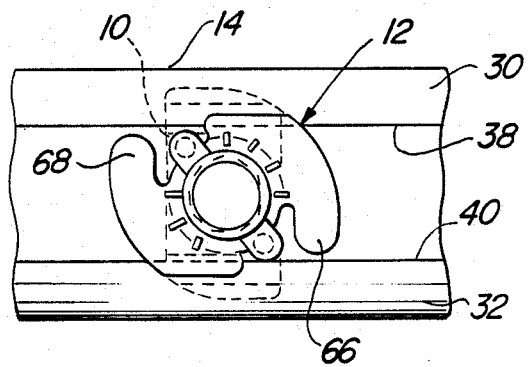
FIG. 3 is a top plan view showing the elements of FIG. 1 in a second locked position.
Figure 4:
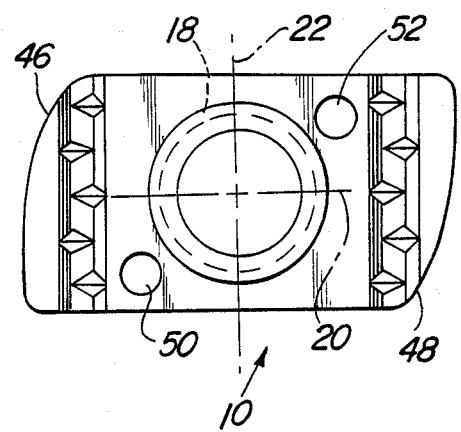
FIG. 4 is a top plan view of the nut of FIG. 1.
Figure 5:
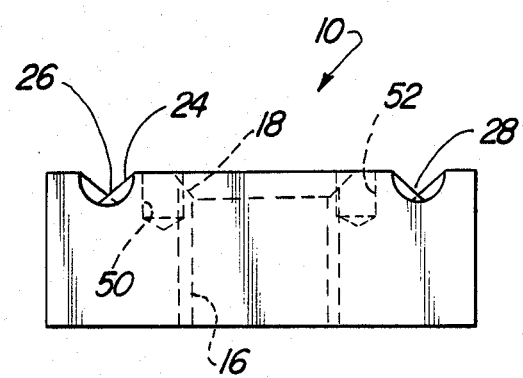
FIG. 5 is a side elevation of the nut of FIG. 4.
Figure 6:
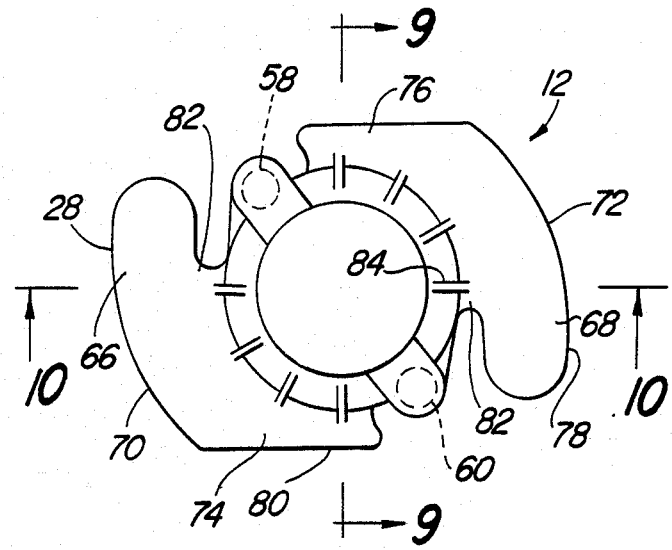
FIG. 6 is a top plan view of the retainer of FIG. 1.
Figure 7:
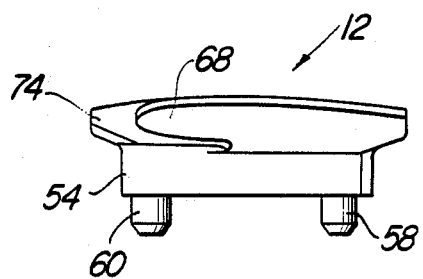
FIG. 7 is a side view of the retainer of FIG. 6.
Figure 8:
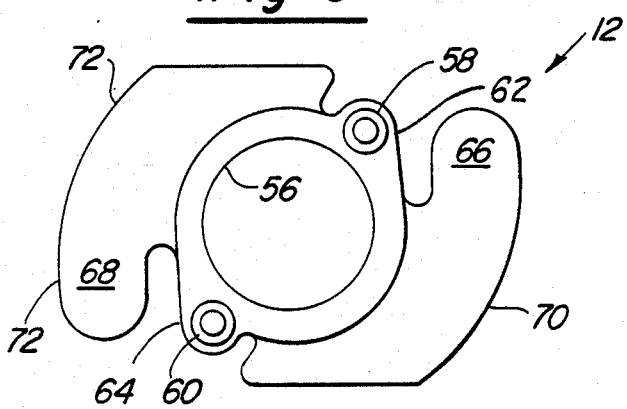
FIG. 8 is a bottom plan view of the retainer of FIG. 6.
Figure 9:
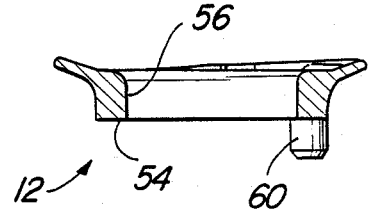
FIG. 9 is a section along the line 9—9 of FIG. 6.

Referring now to the drawings and FIGS. 1-3 a nut 10 and its retainer 12 are shown in association with a channel structural member 14. The nut 10 of FIGS. 4 and 5 has a central threaded bore 16 and is provided with a chamfer 18 for facilitating entry of a bolt or other threaded member into bore 16 in its upper face. The nut further has a major axis 20 and a minor axis 22. The nut as will be noticed is substantially twice as long along its major axis 20 as it is along its minor axis 22. The nut is substantially of a parallelpiped shape. Tooth-like projections 24 are formed in grooves 26 and 28 in the upper face of the nut. The grooves are spaced inwardly of the edges of the nut and run transversely across the major axis from edge to edge of the nut. The sizing of the nut length to length and side to side is governed as is known in the art by the nature of the channels with which it is intended to be used. As seen in FIGS. 1-3, the nut is sized such that when positioned with its major axis parallel to the channel major axis it can be pushed down into the channel through the slot formed between the downwardly sloping and extending lips or radii 30 and 32 of the channel. The nut however is of a length along its major axis that if rotated 90° the nut will extend under the downwardly projecting lips of the channel. The ends of the lips when will be in frictional contact with the projections 24 as is known in the art. A single nut will usually be useful with several sizes of channels. The channel lips have, as shown in FIG. 1, inwardly facing downwardly curving upper portions 34 and 36 which merge into vertically depending lower legs 38 and 40 at the lowermost end of which there are the curvilinear tooth-engaging ends 42 and 44. The nut has its diagonally opposite major edges curved as shown at 46 and 48. The purpose of the curving is to provide clearance for the rotation indicated by FIGS. 1 and 3.

Figure 10:
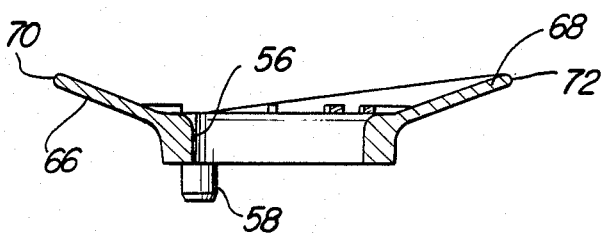
FIG. 10 is a section along line 10—10 of FIG. 6.

The retainer 12, FIGS. 6-10, has a cylindrical base 54 and a central opening 56 of sufficient size to accommodate the bolts, etc. which the nuts may be engaged with. Depending from the base 54 are a pair of pins 58 and 60 diagonally oppositely positioned. The pins project downwardly from abutments 62 and 64 projecting outwardly from the cylindrical base 54 but lying inwardly of the nut sides defining the minor axis of the nut which is of a width less than the width of the slot in the channel, see FIG. 2. From an inspection of FIG. 1 and FIG. 2 it will be noticed that the diameter of the base of the retainer is such that a clearance space exists between it and the channel lips. FIGS. 2 and 3 show that the arrangement of the pins, and the holes 50 and 52 therefor in the nut, are such that the pins are well within the slot-like opening in the channel during insertion rotation and final positioning of the nut and retainer. The pins are slightly larger in diameter than the holes 50 and 52 in the nut. The pins are chamfered as shown in FIG. 10, and the retainer pins are forced into the holes in the nut. The resulting interference fit locks the retainer to the nut along a horizontal plane of the base.

The retainer is provided with a pair of wing members 66 and 68. The wing members project outwardly and upwardly from the upper edge of base 54 and from opposite sides thereof. The upward projection being at an angle of about 20 degrees with the horizontal plane of the base of the retainer in the preferred form shown. The wing members extend outwardly approximately transversely with respect to the vertical plane containing the two abutments and said pins 58 and 60. In the form shown the wings have curved outer thumb and finger engageable sections 70 and 72. These are of a length and width such that the nut and retainer can be manipulated by the thumb and finger in order to force the nut downwardly into the channel and turn it into locked position ready for receipt of a bolt or the like.

The wings further include second sections 74 and 76. The outer edge surfaces 78 and 28 of sections 70 and 72 of the wings extend substantially in an arc which is concentric of the base 54 and the bolt hole 56. The sections 74 and 76, however, project outwardly from base 54 a much shorter distance. In fact the outer terminal ends 80 of sections 74 and 76 extend parallel to each other and tangential with respect to the circumference of the base and the bolt hole until they intersect with the curvilinear edges 78 of the thumb and finger sections 70 and 72. The ends or edges 80, FIG. 9, thus form diametrically opposite planar vertical faces. The wings each occupy substantially the space between the two abutments 62 and 64 and in effect divide the retainer into portions extending on major and minor axes thereof with the abutments being positioned at obtuse angles with respect thereto. The planar faces defining the extent of the retainer along the minor axis of the retainer are formed by the lesser portion of the second sections of the wings. The retainers are formed for use with mating nuts and the size of the nuts is selected for use in particularly sized channels. Thus all sizes are related to the intended purposes. According to the invention, as noted in FIGS. 1-4, the holes 50 and 52 for pins 58 and 60 are positioned adjacent to the edges of the retainer along its minor axes and at an angle to both the major and minor axis. Likewise the abutments and pins are so placed on the retainer in respect to its major and minor axis. The arrangement is such however that when engaged with a nut the major axis of the retainer is at right angles to the major axis of the nut. The thumb and finger sections 70 and 72 thus project outwardly a substantial distance beyond the short sides of the nut. The second sections of the wings project perpendicularly of the major axis and parallel to the grooves 26 and 28 terminating at approximately the longitudinal center of said grooves.

The retainer is formed preferably of a material such as a thermoplastic synthetic material which is suitable for injection molding and produces wings which are of proper thickness, are resiliently flexible and yet deformable. In the instant invention the wings are of a thickness of the order of 0.03 inches and the base or connecting portions 82 of the wings which connect the thumb and finger sections to the base of the retainer are not as wide as the outer portion of the wings thus providing for extended frictionally engageable surfaces on the wings but also retaining a desired degree of flexibility. Radially extending ribs 84 are also provided to facilitate rotation of the nut-retainer into final position.

The retainer and nut are inserted into the slot in the channel 14 from above with the thumb and finger sections overlying the lips 30 and 32 of the channel, FIG. 2. The unit is pressed down by using thumb pressure until the upper nut base is below the channel lips. Then while still pressed down the nut is rotated by exerting rotational force on the wings until the nut is in the position shown in FIGS. 1 and 3. The nut is then released whereupon the flexible retainer will force the nut up against the bottom of the lips and the unit will be clamped in position ready for insertion of the bolt or the like. In this position the downwardly projecting legs 38 and 40 of the lips 30 and 32 will be forced into the grooves 26 and 28 and into engagement with the tooth like projections 24. The major portions of the wing members will still overlie the shorter face of the nut but will now be positioned over the open slot in the channel. The second shorter sections of the wings 74 and 76 will be in contact with the lips 30 and 32 with their outermost edges being substantially at or adjacent the apex of the lips. In this position the wings will still exert pressure to secure the unit in position. The bulk of the shorter sides of the wings will however be inwardly of the lips. The base 54 extends upwardly to a point below the uppermost portion of the lips 30 and 32 with the wing section projecting above by virtue of their angular disposition with respect to the base 54. In this position the base 54 lies below the upper edge of the lips 30 and 32. The base is preferably of a diameter less than the width of the slot in the channel in order to facilitate insertion and also collapse of the wings below the apex of the lips. When a member is laid across the channel to be attached thereto by a bolt, the bolt is inserted and tightened. During the tightening process the short sided second sections 74 and 76 of the retainer wings will be forced downwardly of the lips as the tightening progresses with the teeth of the nut being wedged more and more securely against the lower edge of the lips of the channel. The longer thumb-finger sections of the retainer are forced downwardly into the slot. Also the shorter sections will as the tightening continues be forced downwardly along the upper portions of the lips or radii of the channel. Eventually the wings will all be beneath the upper surface of the channel and the connected structural member will have frictional contact with the channel containing the nut. The relatively slippery synthetic material will be forced out of the contact area downwardly of the lips as the engagement of the bolt with the nut continues. The result is a secure fastening of metal to metal in the case of a channel to channel connection. The possibility of slippage thus will be reduced.

Having described my invention, however, many modifications thereto will become apparent to those skilled in the art to which it pertains, without deviation from the spirit of the invention, as defined by the scope of the appended claims.

I claim:

1. A fastener for use in joining the members comprising a nut having an opening adapted to engage a mating member, said fastener being adapted to be engaged with a channel-shaped member having a pair of parallel lip-like portions defining a slot;
    said fastener including a retainer, said retainer being attached to said nut;
    said nut having a major axis and a minor axis and having a groove extending transversely adjacent each of the opposite ends of said nut along said major axis adapted to frictionally engage lip-like portions of said channel member;
    said retainer being formed of a resilient deformable material and comprising a base secured to said nut along a horizontal plane of said base and having an opening aligned with said opening in said nut;
    said retainer having a pair of wing members extending outwardly from said base and upwardly at an angle with respect to the horizontal plane of said base, each wing member including a first section attached to and projecting downwardly from said base transversely of the major axis of said nut a substantial distance beyond a side of said nut;
    said wing members each including a second section extending outwardly at said base and transversely of said major axis of said nut a shorter distance than said first sections and parallel to one of said grooves;
    said second sections each terminating at a vertical plane containing one of said grooves;
    said wing members extending outwardly from opposite sides of said base and being spaced from each other.

2. The fastener of claim 1 including said retainer having a pair of pins projecting downwardly therefrom;
    a pair of openings in said nut fixedly receiving said pins, said pins lying between both said wing members.

3. The fastener of claim 2 wherein said pins lie in a plane extending vertically through said retainer with said wing members respectively being spaced from said pins to opposite sides of said plane.

4. The fastener of claim 1 including said wing members extending outwardly from said base of said retainer adjacent the upper end thereof.

5. The fastener of claim 1 including said wing members extending outwardly and upwardly from said retainer at an angle to the horizontal plane of said retainer base and the upper face of said nut.

6. The fastener of claim 1 including said retainer wing member first sections including outer portions of a size such that they can be manually engaged for rotation of the fastener, said sections being manually engageable for forcing the fastener into a channel.

7. The fastener of claim 6 wherein said second sections extend over said grooves in said nut sufficiently for said second sections to engage a channel and retain said fastener in a locked position within a channel.

* * * * *